Figure 1:
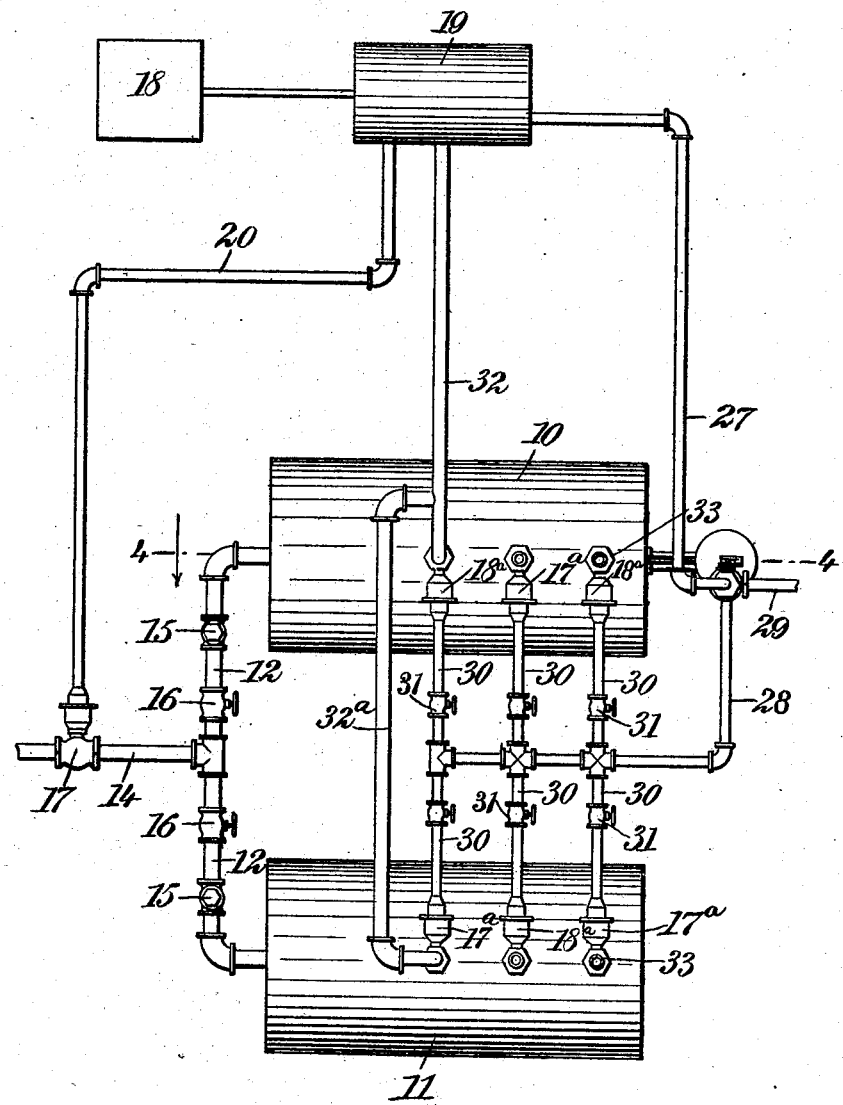

No. 858,588. PATENTED JULY 2, 1907.
G. V. ELLIS.
WATER LIFT.
APPLICATION FILED JULY 13, 1904.

2 SHEETS—SHEET 1.

WITNESSES:

INVENTOR
George V. Ellis
BY
ATTORNEYS

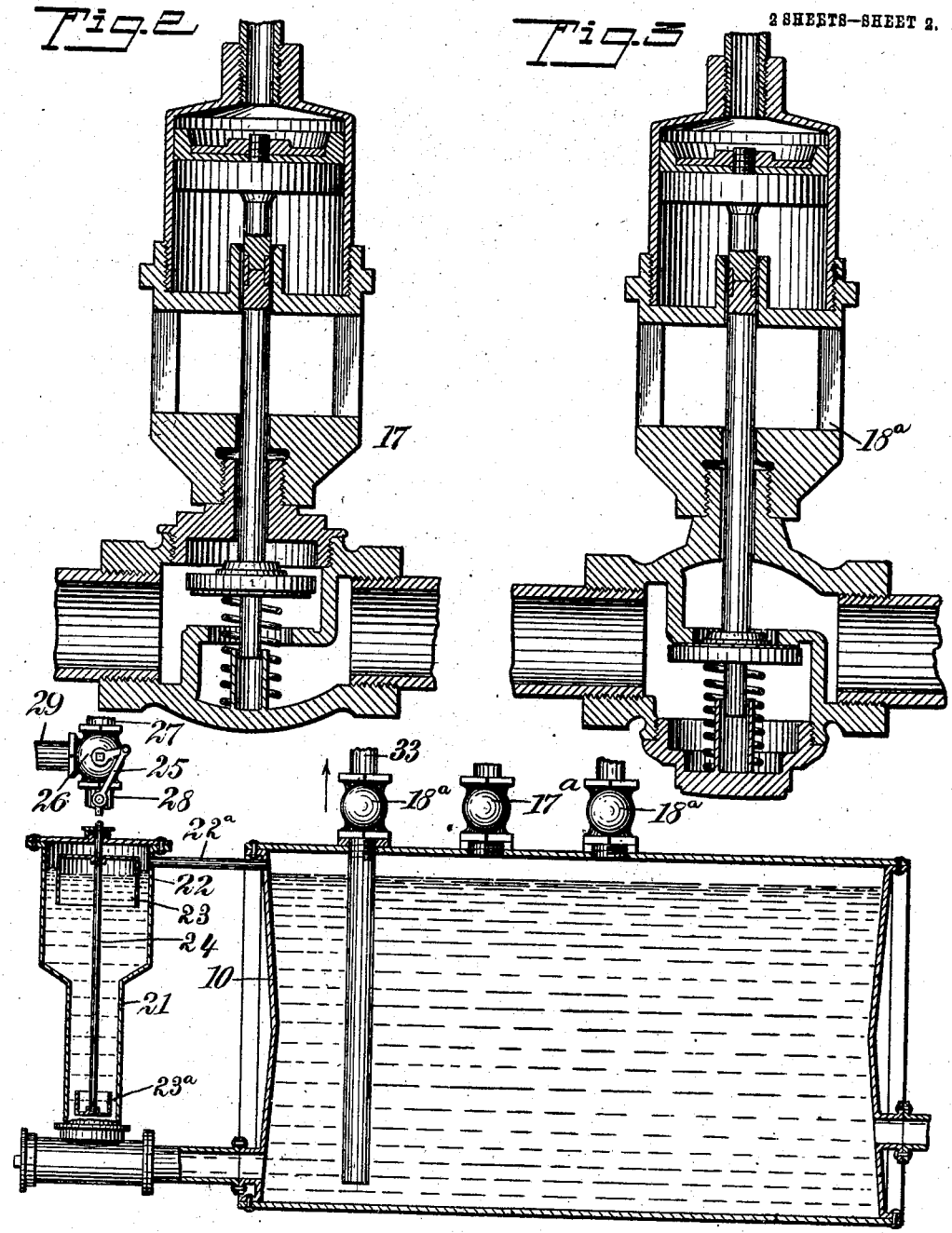

UNITED STATES PATENT OFFICE.

GEORGE V. ELLIS, OF NEW YORK, N. Y., ASSIGNOR, BY MESNE ASSIGNMENTS, TO THE ELLIS COMPANY, OF NEW YORK, N. Y.

WATER-LIFT.

No. 858,588.   Specification of Letters Patent.   Patented July 2, 1907.

Application filed July 13, 1904. Serial No. 216,353.

*To all whom it may concern:*

Be it known that I, GEORGE V. ELLIS, a citizen of the United States, and a resident of the city of New York, borough of Manhattan, in the county of New York and State of New York, have invented a new and Improved Water-Lift, of which the following is a full, clear, and exact description.

This invention relates to a lift for handling liquids of any sort, but is especially adapted for use in raising water into the upper parts of buildings.

In its preferred embodiment the invention comprises two tanks or receivers into which the water flows, and alternately from which the water is ejected by the action of compressed air or other fluid automatically controlled by the height of the water in one of the tanks.

Reference is had to the accompanying drawings which show as an example the preferred embodiment of the invention, in which drawings like letters of reference indicate like parts in the several views, and in which Figure 1 is a partly diagrammatic plan view of the apparatus; Figs. 2 and 3 are sectional views of the two forms of automatic valves which I employ; and Fig. 4 is a sectional view of one of the reservoirs.

10 and 11 indicate two tanks or receivers into which lead the inlet pipes 12 branching from a main supply pipe 14. The inlet pipes 12 are fitted with check valves 15 seated against back flow from the reservoir, and with hand or globe valves 16 by which the pipes may be closed against the flow in either direction. The supply pipe 14 is fitted with an automatic valve which is normally open and which is closed by fluid pressure. This valve is indicated at 17 in Fig. 1, and Fig. 2 may be taken to be a sectional view of said valve in which a spring is employed to hold the valve open, and a piston and cylinder provided to permit the operation of fluid pressure whereby to seat the valve against the action of said spring.

18 may be taken to represent an engine or motor, and 19 a reservoir for compressed air. The cylinder of said valve 17 communicates with the air reservoir by means of a pipe 20, so that when the pressure within the reservoir 19 and pipe 20 becomes sufficiently great to overcome the spring in the valve 17, said valve will be automatically seated.

One of the tanks, for example the tank 10, is provided with a standpipe 21 having a float chamber 22 in its upper end.

22$^a$ indicates a pressure equalizing pipe between the chambers 22 and 10. In this chamber 22 a float 23 is arranged and said float is connected, for example, by a rod 24 and link 25 with a three-way cock 26, one port of which communicates with the reservoir 19 by means of a pipe 27, the other port of which communicates with a pipe 28, and a third port communicates with an exhaust 29 opening into the atmosphere. The rod 24 also carries in the standpipe 21 a bucket 23$^a$, the parts 23 and 23$^a$ acting essentially as in my patent on sewer lifts, dated October 18, 1904, No. 772,710. The pipe 28 has six branches 30, three leading to one tank and three to the other, and each being provided with a globe or hand valve 31. Each pipe 30 leads to the cylinder of one of the aforesaid automatic valves. Said valves are designated 17$^a$ and 18$^a$, the valves 17$^a$ indicating those which are normally opened by the action of a spring, and closed by fluid pressure, and those designated 18$^a$ indicating the valves which are normally seated and opened by the fluid pressure. In Fig. 2, the valve 17 is the same as the valves 17$^a$ in the other figures, and in Fig. 3 one of the valves 18$^a$ is indicated in section, where it will be seen that the spring seats the valve, and fluid pressure applied to its cylinder will unseat the valve. One of the three automatic valves on each tank commands the fluid pressure supply pipes 32 and 32$^a$, which lead from the reservoir 19, so that upon opening and closing these valves the air pressure will be turned on or off as the case may be. A second of the automatic valves of each tank or receiver controls a vent into the atmosphere, and the third controls a discharge pipe 33, and the valves of one tank are seated to work oppositely to the corresponding valves of the other tank; that is to say, the valve controlling the air supply in the tank 10 is, for example, made to open by the application of fluid pressure, and the valve controlling the air supply in the tank 11 is made to operate reversely, *i. e.*, to close upon the application of fluid pressure. The valve in the tank 10 controlling the vent closes by fluid pressure, and the corresponding valve in the tank 11 opens by fluid pressure, and the valve controlling the discharge in the tank 10 opens by fluid pressure and in the tank 11 closes by fluid pressure.

The operation of the apparatus may be traced as follows: Assuming that the tank 10 fills with water, the float 23 will be raised and the three-way cock 26 thrown so as to connect the pipes 27 and 28 and fluid pressure will be supplied to each of the branch pipes 30. The air pressure valve in the tank 10 will thereupon be opened, the vent valve in the tank 10 will be closed, the discharge valve in the tank 10 will be opened and consequently the air pressure entering into the tank will force the water out thereof through the discharge pipe 33. Simultaneously the air pressure valve in the tank 11 will be closed and the vent valve in the tank 11 opened, and a discharge valve in the tank 11 closed and water will flow into the tank filling the same. When the float 23 drops in the chamber 22 the valve 26 will be thrown to close the pipe 27, and to throw the pipe 28 into communication with the drip or exhaust 29, thus relieving the air pressure in the branch pipes 30. Thereupon the air pressure valve of the tank 10 will be closed, the vent valve of the tank 10 will be opened, and the discharge valve of the tank 10 will be closed and simultaneously the air valve of the tank 11 will be opened, the vent valve of the tank 11 closed and the discharge valve of the tank 11 opened, so that the air pressure will exert itself within the tank 11 and eject the water therefrom. While this operation is going on in the tank 11, the tank 10 is again filling, and when the tank 10 is full the float 23 operates again and the above described operation is repeated, and so on the operation goes continuously and automatically as long as the air pressure is supplied to the reservoir or receiver 19, and the water to the branch pipes 12. The automatic valve 17 applied to the pipe 14 is arranged to open until the pressure in the pipe 20 reaches a certain pre-determined point, this valve 17 then closing to shut off the water supply. Assuming that the normal pressure in the receiver 19 is twenty pounds of air, should there be no call for water at the outlet ends of the discharge pipes and these ends of said pipes kept closed (for instance by a service spigot in a dwelling house) the pressure will accumulate in the receiver 19 and will exceed the normal twenty pounds referred to. Let it be assumed that the valve 17 in the pipe 14 will close at thirty pounds air pressure, then as the air pressure continues to rise it will eventually reach thirty pounds close the valve 17 and cut off the water supply from the pipe
14. The parts will continue in this position until the air pressure drops sufficiently to allow the spring of the valve 17 to assert itself and open said valve. This prevents such a rise of water in the receivers as will flood the vents thereof.
By providing positively acting discharge valves I attain the advantage of operating all of the parts of the apparatus positively, so that all movements occur quickly and at the proper time, and also by using a discharge valve opened by positive pressure and held open by the same, I secure an unobstructed discharge flow and avoid the throbbing tendency present, for example, in an ordinary gravity seated check valve.

Various changes in the form, proportions and minor details of my invention may be resorted to at will without departing from the spirit and scope thereof; hence I consider myself entitled to all such variations as may lie within the terms of my claims.

Having thus described my invention, I claim as new and desire to secure by Letters Patent:—

1. In a lift, the combination of a liquid receiver, fluid pressure devices for discharging the same, a valve controlling the liquid inlet into the receiver, and fluid pressure devices connected with the first-named fluid pressure devices for automatically closing the valve upon a predetermined pressure in the said first-named fluid pressure devices.

2. In a lift, the combination of two reservoirs, each having an outlet or discharge, a valve controlling each discharge, and automatic means for alternately opening and closing said valves.

3. In a lift, the combination of two reservoirs each having an outlet or discharge, a valve controlling each discharge, and automatic means regulated by the height of water in one of the reservoirs for alternately opening and closing said valves.

4. In a lift, the combination of two reservoirs having inlets and outlets, a fluid pressure supply means for each reservoir, a valve controlling each fluid pressure supply, a device acting yieldingly to hold one of said valves seated a device acting yieldingly to hold the other of said valves open, and means for intermittently exerting fluid pressure on said valves to hold them contrary to said device for holding them yieldingly closed and open, said means being controlled by the height of water in the lift.

5. In a lift, the combination of two reservoirs having inlets and outlets, a fluid pressure supply means for each reservoir, a valve controlling each fluid pressure supply, a device acting yieldingly to hold one of said valves seated a device acting yieldingly to hold the other of said valves open, and means for intermittently exerting fluid pressure on said valves to hold them contrary to said device for holding them yieldingly closed and open, said means comprising a fluid pressure supply, a valve controlling the same, a float having connection with the valve and a stand pipe communicating with one reservoir and containing the float.

6. A lift, comprising two reservoirs, each having inlets and outlets or discharges, a valve commanding each discharge, the valve of one reservoir having a device acting yieldingly to open the valve, and the valve of the other reservoir having a device acting yieldingly to close the valve, means for causing fluid pressure to be intermittently exerted on said valves to move them contrary to the said yielding devices thereof, and means for forcing the water from the reservoirs when said discharge valves are open.

7. A lift, comprising two reservoirs having inlets and outlets, means for supplying fluid pressure to each reservoir to discharge the contents thereof, a valve controlling each fluid pressure supply, a device acting on each valve, the device of one valve tending yieldingly to open the valve, and the device of the other valve tending yieldingly to close the same, and means for intermittently applying fluid pressure to said valves to move them contrary to said devices.

8. A lift, comprising two reservoirs having inlets and outlets, means for supplying fluid pressure to each reservoir to discharge the contents thereof, a valve controlling each fluid pressure supply, a device acting on each valve, the device of one valve tending yieldingly to open the valve, the device of the other valve tending to close the same, and means for intermittently applying fluid pressure to said valves to move them contrary to said devices, said means comprising a float actuated by the height of the water in one of the reservoirs, a valve controlling the fluid pressure supply and a connection between the float and valve.

9. A lift, comprising two reservoirs, means for supplying liquid thereto, means for supplying fluid pressure to each reservoir, a valve controlling each fluid pressure supply, one of said valves having a device tending yieldingly to open it and the other of said valves having a device tending yieldingly to close it, a valve commanding a vent in each reservoir, one of said valves having a device tending yieldingly to open it and the other of said valves having a device tending yieldingly to close it, a valve commanding the discharge from each reservoir, one of said valves having a device tending to open it, and the other of said valves having a device tending to close it, and means for intermittently supplying fluid pressure to all of said valves to operate them contrary to the said devices thereof.

10. A lift, comprising two reservoirs, means for supplying liquid thereto, means for supplying fluid pressure to each reservoir, a valve controlling each fluid pressure supply, one of said valves having a device tending yieldingly to open it and the other of said valves having a device tending yieldingly to close it, a valve commanding a vent in each reservoir, one of said valves having a device tending yieldingly to open it and the other of said valves having a device tending yieldingly to close it, a valve commanding the discharge from each reservoir, one of said valves having a device tending to open it and the other of said valves having a device tending to close it, and means for intermittently supplying fluid pressure to all of said valves to operate them contrary to the said devices thereof, said means comprising a part actuated by the height of water within one of the reservoirs.

11. A lift, comprising two reservoirs, means for supplying liquid thereto, means for supplying fluid pressure to each reservoir, a valve controlling each fluid pressure supply, one of said valves having a device tending yieldingly to open it and the other of said valves having a device tending yieldingly to close it, a valve commanding a vent in each reservoir, one of said valves having a device tending yieldingly to open it and the other of said valves having a device tending yieldingly to close it, a valve commanding the discharge from each reservoir, one of said valves having a device tending to open it, and the other of said valves having a device tending to close it, and means for intermittently supplying fluid pressure to all of said valves to operate them contrary to the said devices thereof, said means comprising a fluid pressure supply, a valve commanding the same, a float connected with the valve, and a standpipe in communication with one of the tanks and having a float operating therein.

12. In a lift, the combination of a liquid receiver, fluid pressure devices for discharging the same, a valve controlling the liquid inlet into the receiver, and means for automatically closing said valve upon the attainment of a predetermined pressure in said fluid pressure devices.

13. In a lift, the combination of a reservoir, intermittently operating devices for automatically discharging the liquid therefrom, a valve controlling the outlet from said reservoir, and means for automatically operating the valve in unison with the operation of said means for discharging the liquid from the reservoir.

14. In a lift, the combination of a reservoir, means for supplying fluid pressure thereto to discharge the same, a valve controlling said fluid pressure supply, a valve controlling the outlet from the reservoir, and automatic devices for simultaneously opening and closing said valves.

15. In a lift, the combination of a reservoir, means for supplying fluid thereto to discharge its contents, a valve controlling the fluid pressure supply, a valve commanding the outlet from the reservoir, and fluid pressure control operated devices for simultaneously opening and closing said valves.

16. In a lift, the combination of two reservoirs, means for supplying fluid pressure to said reservoirs, means for supplying liquid to said reservoirs, a valve controlling each fluid pressure supply, one of said valves having a device tending yieldingly to open it and the other of said valves having a device tending yieldingly to close it, a valve commanding the discharge from each reservoir, one of said valves having a device tending yieldingly to open it and the other of said valves having a device tending yieldingly to close it, and means for intermittently supplying fluid pressure to all of said valves to operate them contrary to said devices thereof.

17. In a lift, the combination of two reservoirs each having a liquid inlet and a liquid outlet, means for supplying fluid pressure to each of said reservoirs to expel the liquid contents thereof, a valve controlling each fluid pressure supply, a device tending to hold one valve yieldingly open, a device tending to hold the other valve yieldingly closed, a float actuated by the liquid in one reservoir, a fluid pressure controlling valve operated by said float, and devices for placing the fluid pressure controlling valve in communication with the said devices of the two first named valves whereby alternately to open and close said valves, and cause the liquid to be alternately expelled from the reservoir.

18. In a lift, the combination of two reservoirs each having a liquid inlet and a liquid outlet, means for supplying fluid pressure to each of said reservoirs to expel the liquid contents thereof, a valve controlling each fluid pressure supply, a device tending to hold one valve yieldingly open, a device tending to hold the other valve yieldingly closed, a float actuated by the liquid in one reservoir, a fluid pressure controlling valve operated by said float, devices for placing the fluid pressure controlling valve in communication with the said devices of the two first named valves whereby alternately to open and close said valves, and cause the liquid to be alternately expelled from the reservoirs, a valve commanding the liquid supply to the said reservoirs, a device tending to hold said valve yieldingly closed, and means communicating with the fluid pressure supply for permitting said pressure to be exerted on the last named valve whereby to close said valve upon the accumulation of a pre-determined pressure in said pressure supply.

In testimony whereof I have signed my name to this specification in the presence of two subscribing witnesses.

GEORGE V. ELLIS.

Witnesses:
ISAAC B. OWENS,
JNO. M. RITTER.